United States Patent [19]

Loewen

[11] Patent Number: 5,036,942
[45] Date of Patent: Aug. 6, 1991

[54] ROTATABLE OPERATOR CONTROL UNLOCKING MECHANISM

[75] Inventor: Kel W. Loewen, Winnipeg, Canada

[73] Assignee: Ford New Holland, Inc., New Holland, Pa.

[21] Appl. No.: 567,417

[22] Filed: Aug. 14, 1990

[51] Int. Cl.⁵ .............................................. B60K 26/00
[52] U.S. Cl. .................................... 180/329; 280/775; 74/493
[58] Field of Search ........................ 180/326, 329, 330; 280/775; 74/493

[56] References Cited

U.S. PATENT DOCUMENTS

| | | | |
|---|---|---|---|
| 3,347,558 | 10/1967 | Grimes et al. | 180/329 |
| 4,059,171 | 11/1977 | Pakosh | 180/329 |
| 4,278,144 | 7/1981 | Perin | 180/329 |
| 4,372,341 | 2/1983 | Crawley | 137/580 |
| 4,674,769 | 6/1987 | Ota et al. | 180/329 |
| 4,822,962 | 4/1989 | MacCourt | 200/61.88 |

OTHER PUBLICATIONS

Ford New Holland Sales Brochure entitled "100 PTO hp BiDirectional ™ Tractor, 9030 Series", copyright 1990.

Primary Examiner—Kenneth R. Rice
Attorney, Agent, or Firm—Larry W. Miller; Frank A. Seemar; Darrell F. Marquette

[57] ABSTRACT

A locking device for a rotatable operator's station for use on a hydrostatically driven tractor is disclosed wherein the locking device includes a spring-loaded pin connected to a flexible cable interconnected with a pivotable steering mechanism. The locking device is released by a pivotal movement of the steering mechanism beyond a normal range of tilting movement to an actuation position in which the overall length of the operator's station is minimized to facilitate the rotation thereof within the narrow confines of a cab enclosure. A pair of latching devices are provided to control the normal tilt movement of the steering mechanism and, respectively, to allow the steering mechanism to move beyond the normal range of tilting movement into the actuation position. Both latching devices must be released to move the steering mechanism to an actuation position to release the locking device and permit rotative movement of the operator's station.

10 Claims, 4 Drawing Sheets

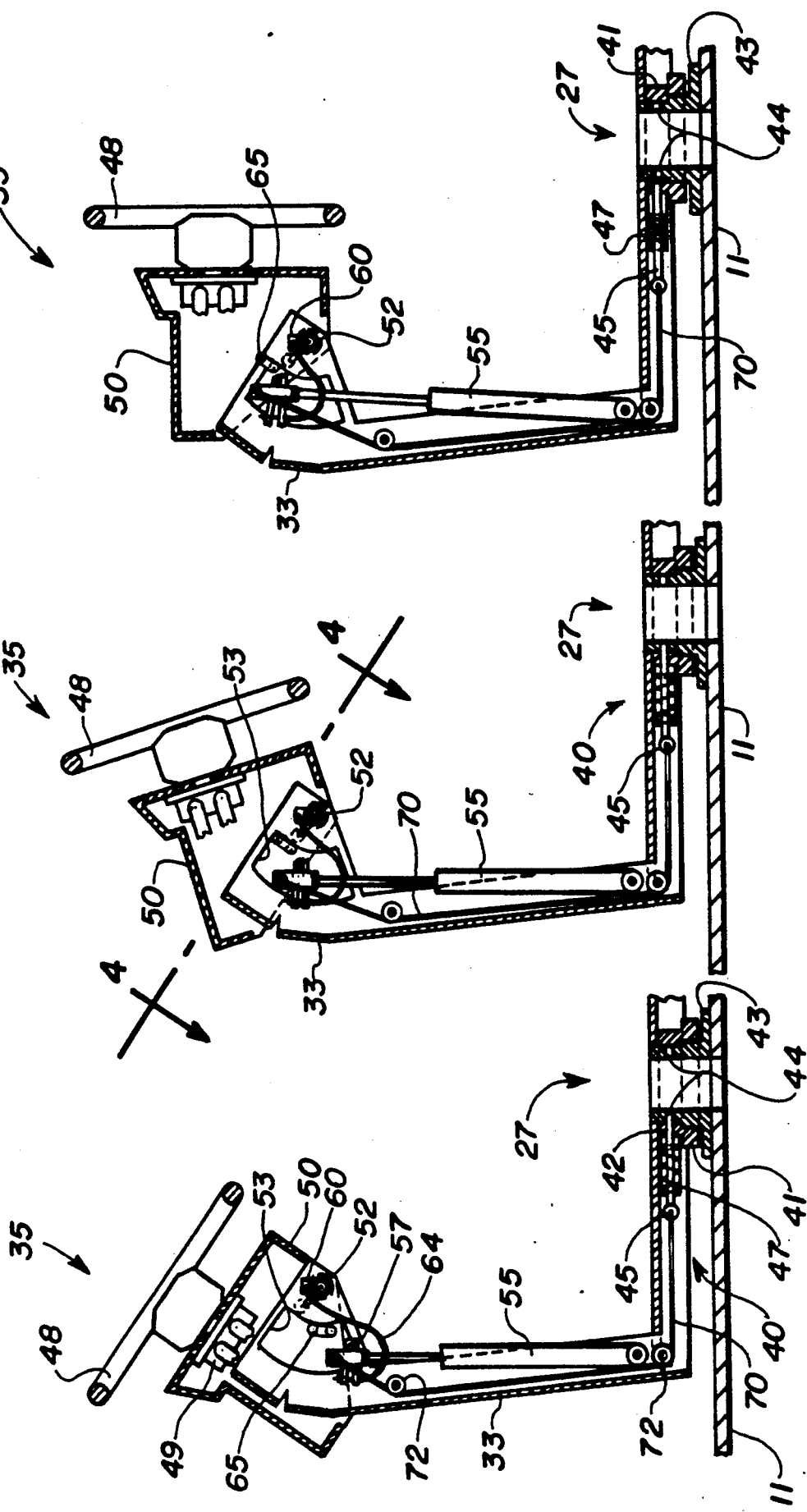

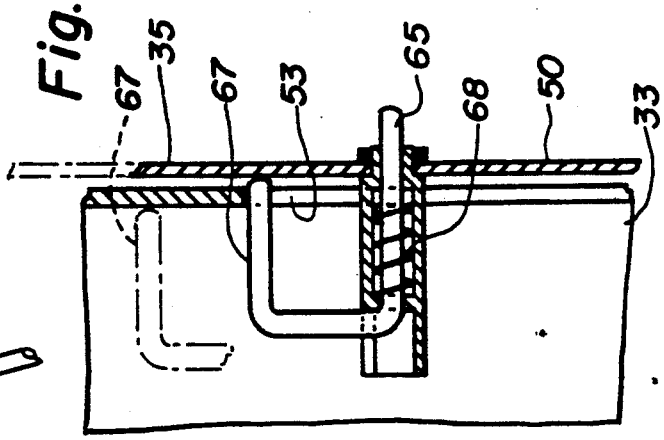
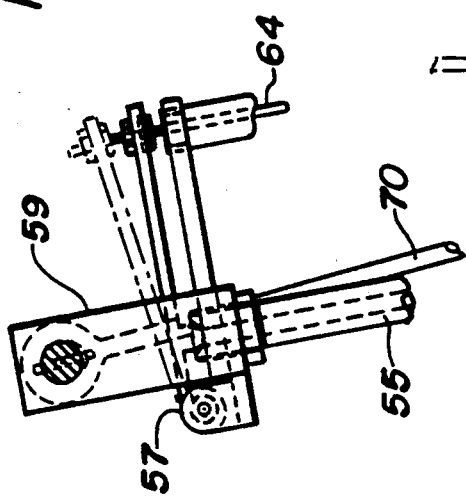
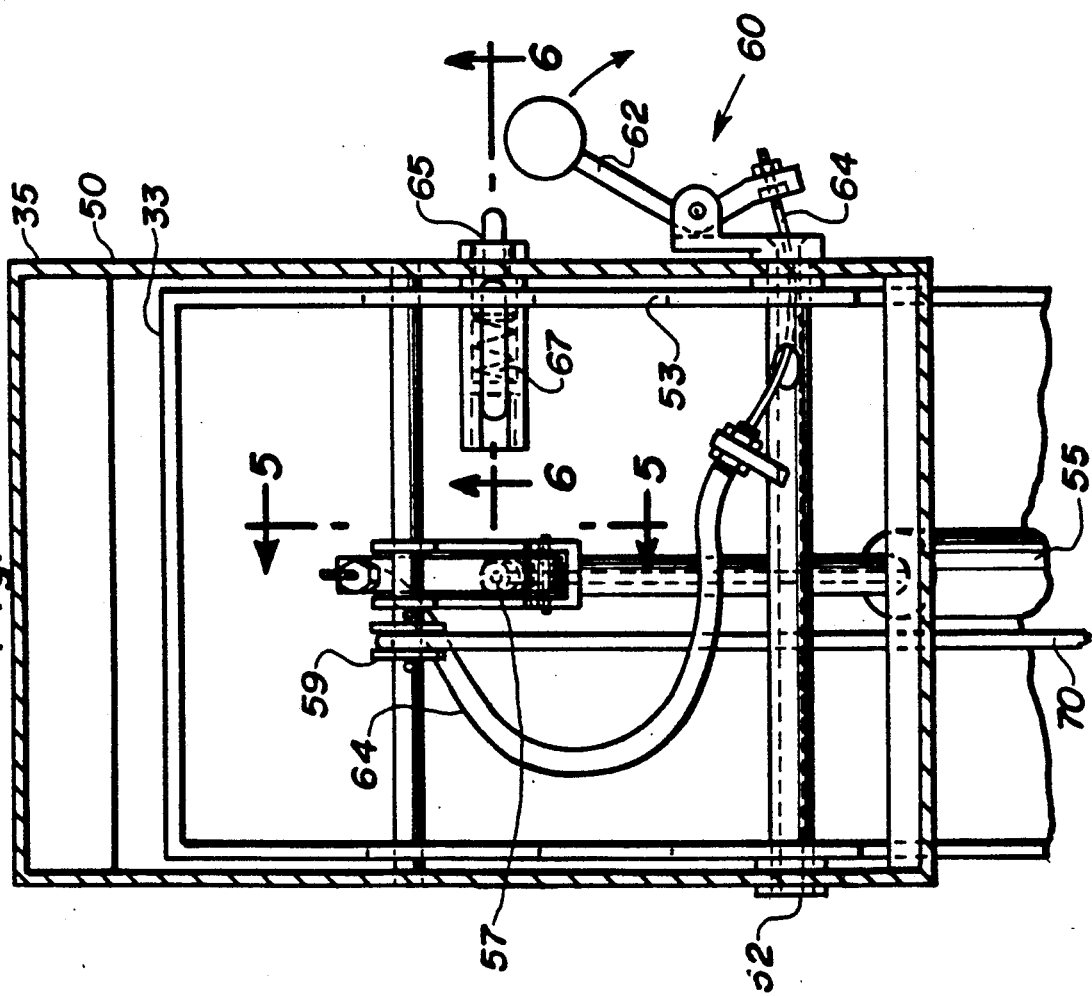

ROTATABLE OPERATOR CONTROL UNLOCKING MECHANISM

BACKGROUND OF THE INVENTION

This invention relates generally to tractors having an operator's station rotatable about an arc of approximately 180° C. to permit proper orientation of the operator for convenient operation in opposing directions and, more particularly, to a locking mechanism for controlling the pivotable movement of the operator's station.

A hydrostatically driven tractor of the type shown in U.S. Pat. No. 4,372,341 and in U.S. Pat. No. 4,822,962, is operable in opposing directions with equal efficiency. To facilitate the operation of such a tractor, the operator seat and steering mechanism are formed as part of a console pivotally supported from the frame of the vehicle to permit a rotation of the console about a generally vertical pivot axis to enable a positioning of the operator sitting in the seat cushion to face the direction of travel irrespective of which opposing direction is considered to be forward.

A locking mechanism is provided with one pivot mechanism to fix the rotatable console in one of two orientations corresponding to the selected forward direction of travel. This locking mechanism comprises a spring-loaded pin interengageable between two rotatably mated parts within the pivot mechanism to lock rotative movement therebetween when engaged. The actuation of the spring-loaded locking mechanism is accomplished through a linkage directly connected to the spring-loaded pin.

It would be desirable a more conveniently operable mechanism for actuating the pivotable movement of the operator's station to redirect orientation of the operator as desired, particularly one that will assure a reduction of the overall length of the console to facilitate rotational movement within the confines of the cab enclosure.

SUMMARY OF THE INVENTION

It is an object of this invention to overcome the aforementioned disadvantages of the prior art by providing a locking device actuating mechanism operable through manipulation of a tiltable steering mechanism.

It is another object of this invention to interconnect the pivotable steering mechanism with the locking device to permit actuation thereof through a tilting movement of the steering wheel.

It is an advantage of this invention that the locking device will not be released to permit rotative movement of the operator's station unless the steering mechanism is tilted into a position to minimize the overall length of the operator's station for rotative movement within the cab of the vehicle.

It is a feature of this invention that the tiltable steering mechanism is operable through a normal range of movement for positionally varying the orientation of the steering wheel relative to the operator without releasing the locking device.

It is another feature of this invention that a second latching mechanism must be engaged to effect a tilting movement of the steering mechanism beyond the normal range of movement into an actuation position to effect a release of the locking device.

It is still another feature of this invention that the tiltable steering mechanism is connected to the locking device by flexible cable movable into a slack condition when the steering mechanism is pivoted throughout its normal range of tilting movement.

It is yet another feature of this invention that the steering mechanism is provided with first and second latching mechanisms for controlling, respectively, the normal tilting movement of the steering mechanism and a pivoting of the steering mechanism into an actuation position beyond the normal range of movement to effect release of the locking device.

It is another advantage of this invention that both latching mechanisms must be actuated to effect a pivotable movement of the steering mechanism into an actuation position releasing the locking device so that the release of the locking device will not be accidentally encountered.

It is still another object of this invention to require a minimizing of the overall length of the operator's station to effect a release of the locking device permitting a rotational movement of the operator's station.

It is still another advantage of this invention that the steering mechanism is positioned in a manner to clear any interference with structural members of the cab enclosure when the steering mechanism is placed into an actuation position releasing the locking device.

It is yet another feature of this invention that the locking device includes a spring-loaded pin automatically re-engaging aligned respective openings in rotatably mounted members of the pivot mechanism upon a return of the steering mechanism from the actuation position to its normal range of movement for positional adjustment.

It is a further object of this invention to provide a locking device actuation mechanism for use with a rotative operator's station which is durable in construction, inexpensive of manufacture, carefree of maintenance, facile in assemblage, and simple and effective in use.

These and other objects, features and advantages are accomplished according to the instant invention by providing a locking device for a rotatable operator's station for use on a hydrostatically driven tractor wherein the locking device includes a spring-loaded pin connected to a flexible cable interconnected with a pivotable steering mechanism. The locking device is released by a pivotal movement of the steering mechanism beyond a normal range of tilting movement to an actuation position in which the overall length of the operator's station is minimized to facilitate the rotation thereof within the narrow confines of a cab enclosure. A pair of latching devices are provided to control the normal tilt movement of the steering mechanism and, respectively, to allow the steering mechanism to move beyond the normal range of tilting movement into the actuation position. Both latching devices must be released to move the steering mechanism to an actuation position to release the locking device and permit rotative movement of the operator's station.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3(a), FIG. 3(b), and FIG. 3(c) are similar partial cross-sectional views of the console taken along lines 3—3 of FIG. 2 to show the pivotable movements of the steering mechanism relative to the housing, FIGS. 3(a) and 3(b) showing the relative positions of the steering mechanism at the extremes of the normal range of movement thereof, FIG. 3(c) depicting the steering mechanism moved into the actuation position;

FIG. 4 is an enlarged cross-sectional view through the steering mechanism corresponding to lines 4—4 of FIG. 3(b), showing the pivotable mounting of the steering mechanism to the supporting housing and the latching mechanisms associated therewith;

FIG. 5 is a partial cross-sectional view of the steering mechanism corresponding to lines 5—5 of FIG. 4 to show an elevational view of the connection of the flexible link to the end of the valved air cylinder, the operational movement of the first latching mechanism being shown in phantom; and FIG. 6 is a partial cross-sectional view of the second latching mechanism corresponding to line 6—6 of FIG. 4, the operative movement of the second latching mechanism into a release position being shown in phantom.

DETAILED DESCRIPTION OF THE PREFERRED EMBODIMENT

Figure 1:
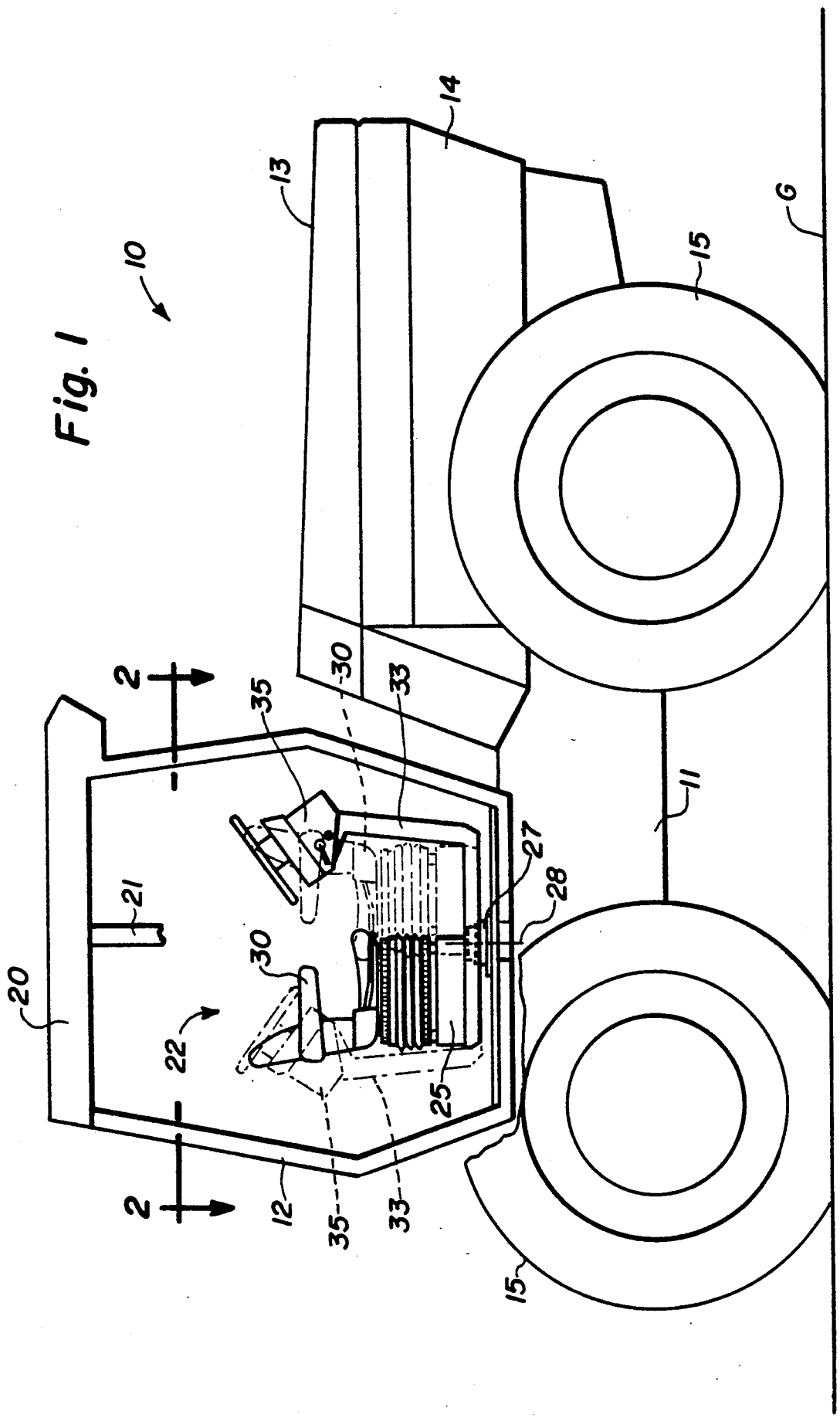
FIG. 1 is a side elevational view of a tractor incorporating the principles of the instant invention, a portion of the operator's cab being broken away to more clearly show the operator's station, the rotative movement of the console being shown in phantom.

Referring now to FIG. 1, a side elevational view of a tractor 10 incorporating the principles of the instant invention can best be seen. As described in U.S. Pat. No. 4,372,341 and in U.S. Pat. No. 4,822,962, the descriptive portions of both said patents being incorporated herein by reference, the tractor 10 is hydrostatically driven and can be operated with equal efficiency in either opposing direction. The tractor 10 is typically referred to as having a cap end 12 and an engine end 13 to which reference is typically made to indicate the forward direction of travel. The tractor 10 is provided with a frame 11 supported above the ground G by conventional ground wheels 15. Operative power is provided by an engine (not shown) enclosed within the hood 14 positioned at the engine end 13 of the tractor 10. The tractor 10 is preferably articulated so that steering can be accomplished through manipulation of the articulation joint (not shown). Alternatively, the tractor 10 could be steered through a conventional pivotable turning movement of one pair of the ground wheels 15.

The operator's cab 20 is mounted on the cab end 12 of the tractor 10 and forms an enclosure within which the operator's station 22 is positioned. The operator's station 22 is best seen with reference to FIGS. 1 and 2 and includes a pivotable console 25 mounted on a pivot mechanism 27 supported by frame 11. The pivot mechanism 27 defines a pivot axis 28 about which the console 25 is rotatably movable to orient the operator so that the operator is facing the selected forward direction of travel.

Figure 2:
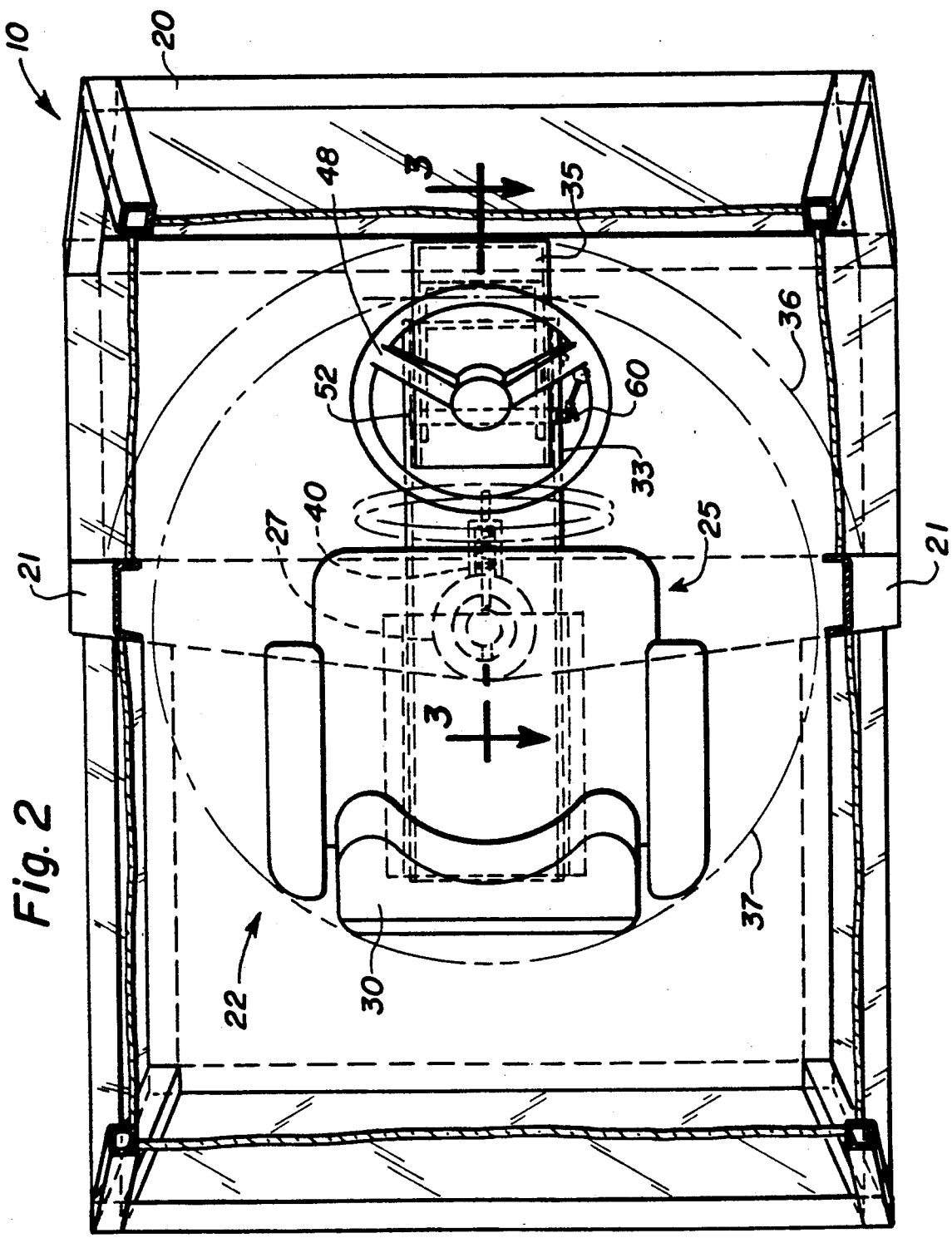
FIG. 2 is a partial cross-sectional view of the vehicle showing the operator's station corresponding to lines 2—2 of FIG. 1.

The console 25 includes a seat 30, a steering mechanism 35 and a hollow housing 33 extending between the seat 30 and the steering mechanism 35 to position the steering mechanism 35 at an appropriate location for convenient manipulation by the operator positioned in the seat 30. The cab 20 provides a relatively small space within which the console 25 can be pivotally moved about the axis 28. Accordingly, it is necessary to reduce the overall length of the console 25 by tilting the steering mechanism 35 toward the seat 30 to permit the steering mechanism 35 to clear the cab support post 21 during its rotative movement. The arc 36 shown in FIG. 2 depicts the path of movement of the housing 33/steering mechanism 35 if not tilted fully toward the seat 30, whereas arch 37 indicates the arcuate path of movement of the housing 33/steering mechanism 35 if properly positioned. As can be seen in FIG. 2, the arc 36 would result in an interference between the housing 33 and the support post 21.

Referring now to FIGS. 2, 3(a), 3(b), and 3(c), it can be seen that the pivot mechanism 27 is provided with a locking device 40 interengageable therewith to restrain rotative operation thereof. The pivot mechanism is provided with an outer half 41 rotatably supported on and mated with an inner half 43 fixed to the frame 11 to provide rotative support for the console 25. The outer half 41 of the pivot mechanism 27 is provided with a hole 42 alignable with the locking pin 45 forming a part of the locking device 40. The inner half 43 of the pivot mechanism 27 has a pair of opposing holes 44 alignable with the hole 42 in the outer half 41 to provide an aligned passage for the interengagement with the locking pin 45 to restrict rotative movement between the outer half 41 and the inner half 43 of the pivot mechanism 27. The locking pin 45 is carried by the outer half 41 of the pivot mechanism 27 and is biased by a spring 47 toward engagement of the locking in with the pivot mechanism 27.

The steering mechanism 35 is shown in FIGS. 3(a)-3(c) as being of the type utilizing a steering wheel 48 to control a hydraulic mechanism 49 for effecting steering operation of the tractor 10 in a conventional manner. The steering mechanism 35 also includes a shroud 50 pivotally mounted on the housing 33 for movement about a pivot axis 52. The housing 33 is provided with an arcuate slot 53 defining the normal range of tilting movement afforded to the steering mechanism 35. The pivotable movement, i.e. the tilting movement, of the steering mechanism 35 is controlled by a conventional valved air cylinder 55 interconnecting the shroud 50 and the housing 33. The operation of the valved air cylinder 55 is controlled by a first latching mechanism 60. The extremes of the normal range of tilting movement of the steering mechanism 35 relative to the housing 33 is exhibited in FIGS. 3(a) and 3(b).

Referring now to FIGS. 3(a)-6, the pivotable movement of the steering mechanism 35 relative to housing 33 can best be described. The first latching mechanism 60 includes a lever 62 operatively connected to a push-/pull cable 64 which is in turn connected to the conventional valve outlet 57 of the valved air cylinder 55. To effect a tilting movement of the steering mechanism 35 relative to the housing 33, the operator manipulates the lever 62 into a release position which pulls on the cable 64 to permit air to escape from the valved air cylinder 55 through the valve outlet 57, allowing the steering mechanism 35 to be pivotally moved about the axis 52 in a conventional manner so long as the valve outlet 57 is open. Once the selected tilt position of the steering mechanism 35 has been obtained, the lever 62 is returned to the original restraining position closing the valve outlet 57 and fixing the extension of the valved air cylinder 55.

The steering mechanism 35 also includes a second latching mechanism 65 which is movable within the slot 53 in the housing 33. The second latching mechanism 65 is positioned in interfering relationship with the ends of the slot 53 to define the limits of the tilting movement of the steering mechanism 35 due to engagement of the second latching mechanism with the respective ends of the slot 53. The second latching mechanism 65 includes a stop member 67 positioned so that the stop member 67 is engageable with the upper end of the slot 53. The stop member 67 is spring-loaded by a spring 68 to bias the stop member 67 toward engagement with the upper end of the slot 53. The force of the spring 68 can be overridden when the second latching mechanism 65 is placed into a release position (shown in phantom in FIG. 6) to permit the stop member 67 to pass by the upper end of the slot 53, thereby allowing the steering mechanism 35 to pivotally move about the axis 52 beyond its normal range of tilting movement into an actuation position depicted in FIG. 3(c).

A flexible cable 70 extending from a mounting bracket 59 affixed to the valved air cylinder 55 adjacent the valve outlet 57 interconnects the shroud 50 of the steering mechanism 35 and the locking pin 45 of the locking device 40. During normal operation of the steering mechanism 35, with the positional movement thereof being within the normal range of movement, such that the second latching mechanism is positioned in a restraining position within the slot 53, the flexible cable 70 is in a slack condition and exerts no force on the locking pin 45 to overcome the force of the spring 47. However, when the steering mechanism 35 is moved into the actuation position shown in FIG. 3(c), the further extension of the valved air cylinder 55 effects a pulling of the flexible cable 70 on the blocking pin 45.

The flexible cable is entrained around pulleys 72 to effect a change of direction thereof, and overcomes the biasing force of the spring 47 to effect a disengagement of the locking pin 45 from the inner half 43 of the pivot mechanism 27, thereby freeing the console 25 to rotate about the pivot axis 28. Since the further tilting of the steering mechanism 35 outside of the normal range of movement to the actuation position requires a further extension of the valved air cylinder 55, one skilled in the art will readily realize that movement of the steering mechanism 35 into the actuation position shown in FIG. 3(c) requires simultaneous manipulation of both the first and second latching mechanisms 60, 65.

In operation, a rotation of the console 25 to orient the operator seated in the seat 30 in the opposing direction, the operator must first minimize the overall length of the console 25 by moving the seat 30 toward the steering mechanism 35, provided that the seat 30 is equipped with an adjustment mechanism providing such movement, and by tilting the steering mechanism 35 toward the seat 30 into the actuation position shown in phantom in FIG. 2 and in solid lines in FIG. 3(c). Since the overall length of the console 25 is thereby minimized to permit passage by the support post 21 of the cab 20, as depicted by the arc 37 in FIG. 2, the operator is ready to effect rotation of the console 25 to reorient the operator's station 22 in the opposing direction.

The movement of the steering mechanism 35 into the actuation position shown in FIG. 3(c) can be accomplished only by simultaneous manipulation of both the first latching mechanism 60 permitting a further extension of the valved air cylinder 55, and the second latching mechanism 65, permitting the stop member 67 to pass beyond the end of the slot 53, enabling the movement of the steering mechanism 35 about the axis 52 to extend beyond its normal range of movement to the actuation position. The movement of the steering mechanism 35 into the actuation position effects a pulling of the cable 70, which transfers the tension to the locking pin 45 to overcome the biasing force of the spring 47 and permit a withdrawal of the locking pin 45 from the hole 44 aligned therewith in the inner half 43 of the pivot mechanism 27. The operator may then manually rotate the console 25 about the pivot axis 28 until the steering mechanism clears the respective support post 21 whereupon the steering mechanism 35 can be returned to the normal range of tilting movmement by the manipulation of the first latching mechanism to permit a movement of the valved air cylinder 55, thereby relaxing the tension exerted on the locking pin 45.

The spring forces exerted by the spring 47 on the locking pin 45 will effect a re-engagement of the locking pin 45 with the opposing hole 44 in the inner half 43 of the pivot mechanism 27 when aligned therewith. Correspondingly, the spring force exerted by the spring 68 on the second latching mechanism 65 will return the stop member 67 into a restraining position shown in solid lines in FIG. 6. Accordingly, the pivotable movement of the operator's station 22 can be effected by appropriate manipulation of the tilting movement of the steering mechanism 35.

It will be understood that changes in the details, materials, steps and arrangements of parts which have been described and illustrated to explain the nature of the invention will occur to and may be by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a frame supported above the ground by ground engaging wheels to mobilely support said vehicle over the ground; and operator controls supported by said frame to control operative functions of said vehicle, including directional control of the mobile movement of said vehicle over the ground, said operator controls including a pivotable console selectably rotatable about a pivot mechanism defining a generally vertical pivot axis for the rotation of said console through an arc of at least approximately 180°, said console including a seat, a selectively positionally adjustable steering mechanism for controlling the directional movement of said vehicle, and a locking device operatively associated with said pivot mechanism to restrain the rotative movement of said console, said steering mechanism being positionally adjustable through a normal range of movement to vary the position of said steering mechanism relative to said seat, said locking device being movable between a locking position in which the console is restrained from pivotal movement and an unlocking position in which the console is permitted to rotate, the improvement comprising:

actuating means interconnecting said steering mechanism and said locking device to effect movement of said locking device through positional movement of said steering mechanism.

2. The vehicle of claim 1 wherein said steering mechanism is selectively movable beyond said normal range of movement into an actuating position, said locking device being retained in said locking position throughout said normal range of movement of said steering mechanism and being moved into said unlocking position when said steering mechanism is moved into said actuating position.

3. The vehicle of claim 2 wherein said actuating means includes a linking member extending from said steering mechanism to said locking device to effect movement of said locking device from said locking position to said unlocking position when said steering mechanism is moved to said actuating position, said linking member accommodating the movement of said steering mechanism throughout said normal range of movement without effecting movement of said locking device.

4. The vehicle of claim 3 wherein said linking member is a flexible cable having a length that will effect movement of said locking device when said steering mechansim moves to said actuating position, said flexible cable being in a slack condition when said steering mechanism is positioned within said normal range of movement, said locking device being biased toward said locking position.

5. The vehicle of claim 4 wherein said steering mechanism is provided with a first latching means for controlling the positional movement of said steering mechanism within said normal range of movement and with a second latching means for controlling the movement of said steering mechanism from said normal range of movement to said actuating position, both said first and second latching means being movable between a release position in which said steering mechanism is permitted to be moved and a restraining position in which the steering mechanism is restrained from positional movement.

6. The vehicle of claim 5 wherein said console further includes a hollow housing extending from said seat to said steering mechanism, said flexible cable being positioned within said housing.

7. The vehicle of claim 6 wherein said actuating position locates said steering mechanism closer to said seat than when said steering mechanism is within said normal range of movement, thereby minimizing the overall length of said console for rotational movement.

8. The vehicle of claim 7 wherein steering mechanism is pivotally mounted on said housing, said second latching means being carried by said steering mechanism and movable within a slot formed in said housing, said second latching means including a stop member engaging an end of said slot to define a limit of said normal range of movement for said steering mechanism, the movement of said second latching means to said release position effecting a disengagment of said stop member from said slot to permit said steering mechanism to move to said actuating position.

9. The vehicle of claim 8 wherein said steering mechanism further includes a valved air cylinder controlling the pivotal movement of said steering mechanism relative to said housing, said first latching means being connected to said valved air cylinder to control the operation thereof.

10. The vehicle of claim 9 wherein both said first and second latching means must be manipulated to said release position to effect movement of said steering mechanism to said actuating position.

* * * * *